United States Patent [19]

Bozzo et al.

[11] 4,298,295

[45] Nov. 3, 1981

[54] COMPOSITE FLEXIBLE CONDUIT FOR SUCKING LARGE VOLUMES OF SEA WATER FROM DEEP WATER BODIES

[75] Inventors: Gian M. Bozzo, Treviso; Paolo Gava, Padua; Antonio Paruzzolo, Venice, all of Italy

[73] Assignee: Tecnomare S.p.A., Venice, Italy

[21] Appl. No.: 8,481

[22] Filed: Feb. 1, 1979

[30] Foreign Application Priority Data

Mar. 3, 1978 [IT] Italy ................. 20833 A/78

[51] Int. Cl.³ .................. F02D 21/00; E02B 9/00
[52] U.S. Cl. ................... 405/52; 138/118; 405/195
[58] Field of Search ............ 405/52, 195–210; 138/118–125; 60/641; 114/264, 265, 266, 270

[56] References Cited

U.S. PATENT DOCUMENTS

| | | | |
|---|---|---|---|
| 580,226 | 4/1897 | Sanford | 405/170 |
| 2,827,268 | 3/1958 | Staaf | 405/52 X |
| 3,067,712 | 12/1962 | Doerpinghaus | 405/210 X |
| 3,230,967 | 1/1966 | Castro | 405/210 X |
| 3,311,132 | 3/1967 | McWilliams | 405/171 X |
| 3,435,793 | 4/1969 | Shurtleff | 405/210 X |
| 3,467,013 | 9/1969 | Conner | 405/171 X |
| 3,758,083 | 9/1973 | Palmer | 405/52 X |
| 4,051,810 | 10/1977 | Breit | 405/52 X |
| 4,110,994 | 9/1978 | Lundh | 405/168 X |

*Primary Examiner*—Dennis L. Taylor
*Attorney, Agent, or Firm*—Morgan, Finnegan, Pine, Foley & Lee

[57] ABSTRACT

For conveying very large volumes of sea water from sea bottom to the surface in order to exploit the temperature differential between the surface layers and the bottom layer and thus produce power, a flexible conduit is provided which is composed by cylindrical sections of a resilient reinforced material connected by hoops of a rigid material, an array of cables extending longitudinally of the conduit being secured to said hoops. The conduit can be assembled or disassembled by a stepwise operational sequence.

5 Claims, 6 Drawing Figures

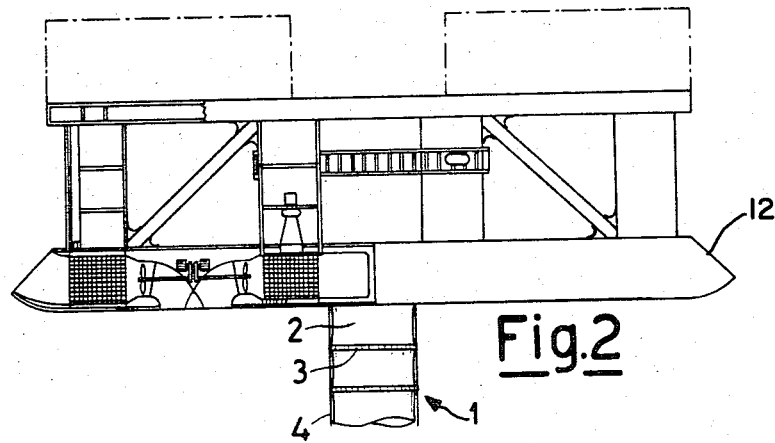
Fig. 2
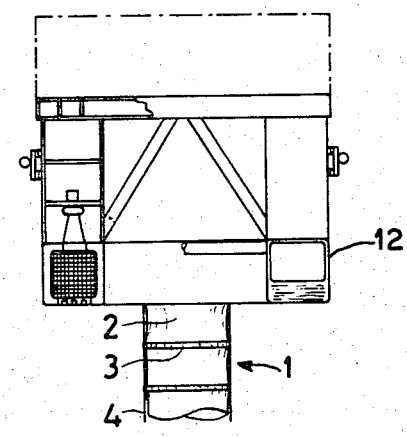
Fig. 3
Fig. 4
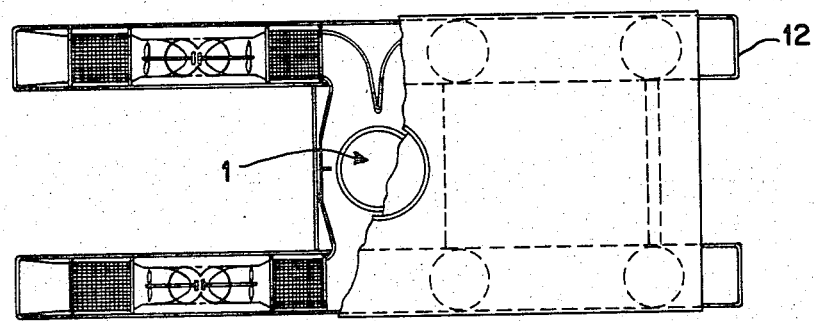

COMPOSITE FLEXIBLE CONDUIT FOR SUCKING LARGE VOLUMES OF SEA WATER FROM DEEP WATER BODIES

This invention relates to a duct (1) adapted vertically to convey from deep water bodies to the surface large flows of sea water to feed electric power stations and/or any other industrial installations and/or civil plants which exploit the temperature differentials in seas.

Installations for the conversion of power derived from the temperature differentials in oceans produce huge rates of flow of comparatively warm surface water and similar masses of cold water drawn from the bottom at a depth varying between 500 and 1000 meters.

For drawing such large masses it is necessary to have a large size duct available which conveys cold water from such depths up to a floating structure on which the installation of the thermal power cycle is located.

Cold water is drawn by pumps through said duct, the diameter of which varies from 10 to 50 meters.

Several suggestions have been made for embodying such huge conduits connected to the floating structure.

Usually, a duct is suggested which is structurally rigid and is made of steel or cement or aluminium or a rigid reinforced plastics material.

The conduit according to the present invention sharply differs from the approaches suggested heretofore due to its original structural configuration and the features which are radically different both as regards the component parts and the operability.

The flexible conduit according to the present invention will now be described in detail with reference to the accompanying drawings which illustrate a practical embodiment by way of example and without limitation, modifications and changes being possible without departing from the scope and objects of the invention.

The conduit is composed of modular elements in such a number as to reach the desired depth starting from the point of connection at the floating platform.

IN THE DRAWINGS

FIG. 2, is a longitudinal sectional view of the floating structure and conduit of FIG. 1;

FIG. 3, is an end view of the floating structure and conduit of FIG. 1;

FIG. 4, is a plan view of the floating structure and conduit of FIG. 1;

Figure 1:
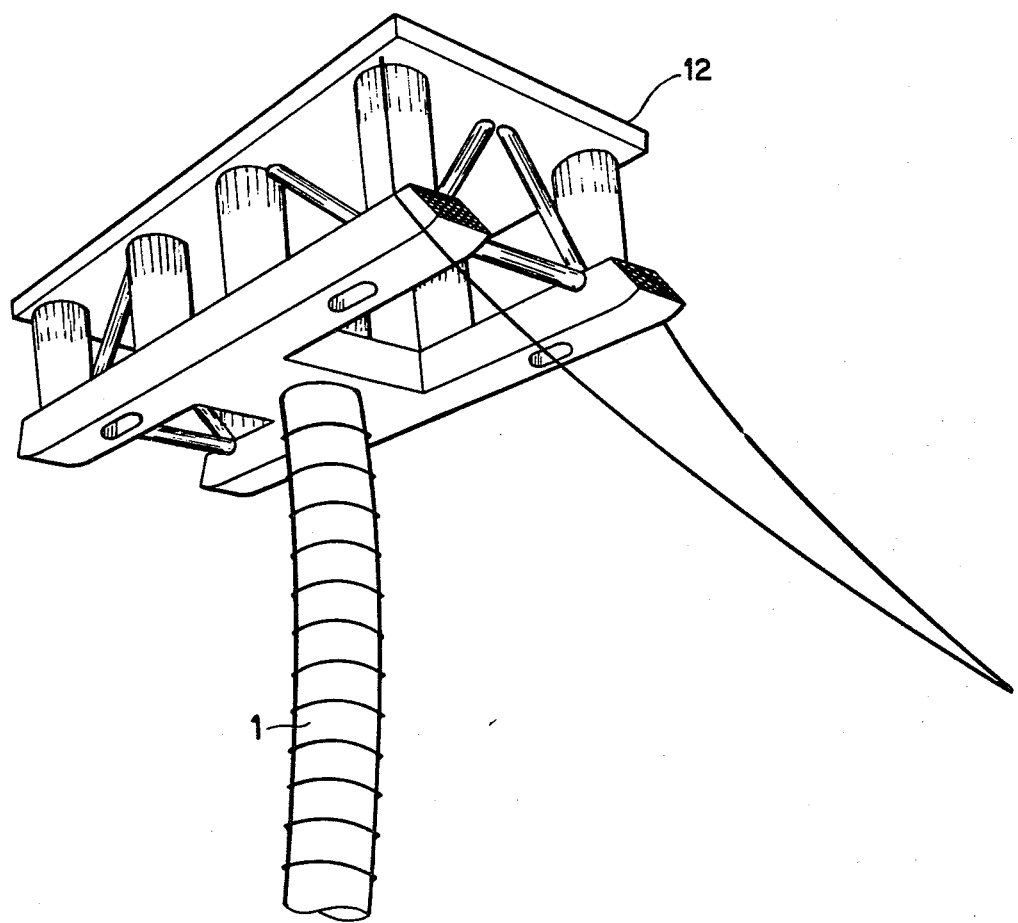
FIG. 1, is a perspective view of a floating structure to which is secured one embodiment of the conduit of the present invention.

The composite structure of the conduit, as shown in the accompanying drawings FIGS. 1, 2, 3, 4, 5 and 6 comprises:
  cylindrical sections of a resilient membrane (2) reinforced by a specially provide textile reinforcement stiffening hoops (3)
  longitudinal connecting cables (4).

The reinforcing elastic membranes (2) are connected to the stiffening hoops (3) in such a way as to form the conduit (1).

Thus, the piping is formed by the sequential array of a membrane section (2), a hoop (3), a membrane section (2) and so forth.

Figure 5:
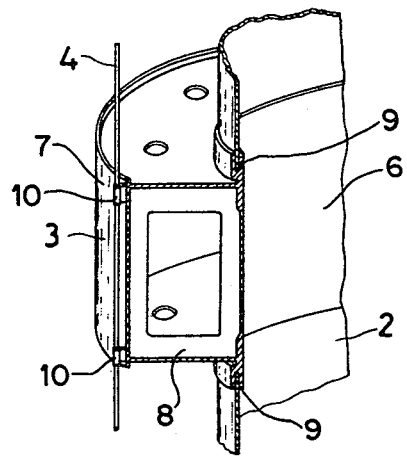
FIG. 5, is a perspective view of a portion of the conduit of FIG. 1 which illustrates the interconnect between the elastic membrane cables and stiffening hoops of such conduit.
Figure 6:
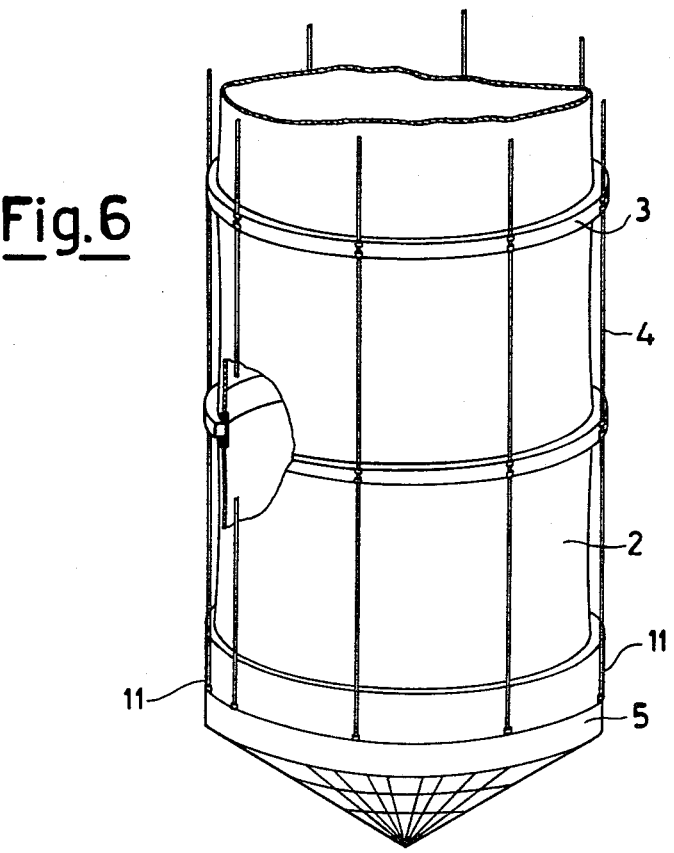
FIG. 6, is a perspective view of the lower portion of the conduit of FIG. 1.

As shown in FIGS. 5 and 6, each hoop (3) is an annular box-like structure having inner and outer annular walls (6) and (7) with a rectangular frame (8) therebetween. The inner wall (6) includes grooves (9) in its top and bottom edges into which is secured the elastic membranes (2).

The distance between one hoop (3) and its next may vary from a quarter of the conduit diameter to the diameter of the conduit (1). The weight of the hoops (3) affords both the circular form to the membrane (2) and the substantially vertical orientation of the conduit (1). As a matter of fact, even though the conduit (1) is substantially elastic and is deprived of rigidity to bending, it still retains its vertical configuration when hung to the floating platform (6), even in spite of the thrust of the sea currents. In addition, possible radial positive or negative pressures which cause radial and circumferential sags and deformations are counteracted by the same weight which provides the vertical configuration.

In the lowermost (deepest) section of the conduit (1), the necessary vertical load is furnished by an appropriate loading of the hoop at the intake opening (5).

The vertical cables (4) which are arranged parallel to and about the conduit (1) are secured to the hoops (3), as particularly shown in FIGS. 5 and 6, and contribute to absorb those accidental or periodical stresses which are susceptible of stressing the membrane beyond its safety load. Specifically the outer wall (7) of the hoop (3) includes projections (10) which extend from its top and bottom edges and through which the cables (4) extend parallel to the conduit (1). As shown in FIG. 5, the lower ends (11) of the cables (4) are secured to the hoop which forms the intake opening (5).

From an operative standpoint, the conduit (1) according to this invention has the property of being subdivided into a number of modular elements which are assembled on the bridge of the floating structure (12) at the time which is the most appropriate both as regards the start-up of the installation and the weather conditions on sea.

As a matter of fact, the conduit (1) is assembled by an automatic step-by-step procedure, by assembling the several component parts which have been previously stored on the platform (12) or any other supporting means.

The same procedure, when performed in the reversed order, affords an opportunity to withdrawn the conduit (1) whenever such an operation becomes necessary due to operative and/or maintenance requirements of the system.

We claim:

1. In a power station which exploits the temperature differential between the bottom and the surface of a body of water to produce power,
  a substantially flexible conduit connected to the station at the surface of the body of water, wherein said conduit extends essentially vertical in the body of water, comprising:
  a sequential array of essentially vertical cylindrical sections of a resilient material though which water is conveyed from the bottom of the body of water, and annular stiffening hoop members, each of which has inner and outer annularly spaced walls, wherein adjacent cylindrical sections are secured to said inner walls thereof to thereby connect said sections to said hoop member, and wherein the weight of said hoop members gives the cylindrical configuration to said sections and provides weight for maintaining said conduit in the essentially vertical position, and a plurality of flexible cables arranged about said sections and hoop members parallel to the central axis of said conduit, wherein said cables are secured to said outer walls of said hoop members, and wherein said cables absorb stresses which would otherwise stress said cylindrical sections.

2. The water conveying conduit of claim 1, wherein said inner wall of each hoop member includes annular grooves in the top and bottom edges thereof into which adjacent cylindrical sections are secured.

3. The water conveying conduit of claim 1, wherein said outer wall of each said hoop member includes projections extending therefrom through which said cables extend and to which said cables are connected.

4. The water conveying conduit of claim 1, wherein the distance between adjacent hoop members is from between one-fourth to the conduit diameter to the conduit diameter.

5. The water conveying conduit of claim 1, wherein the lower most cylindrical section includes an intake opening for the water and about which are provided loading means for maintaining the conduit in the essentially vertical portion.

* * * * *